3,261,433
SLACK ADJUSTERS FOR VEHICLE BRAKES
Wilbur M. Page, Lincoln, England, assignor to Clayton Dewandre Company Limited, Lincoln, England
Filed May 4, 1964, Ser. No. 364,700
4 Claims. (Cl. 188—196)

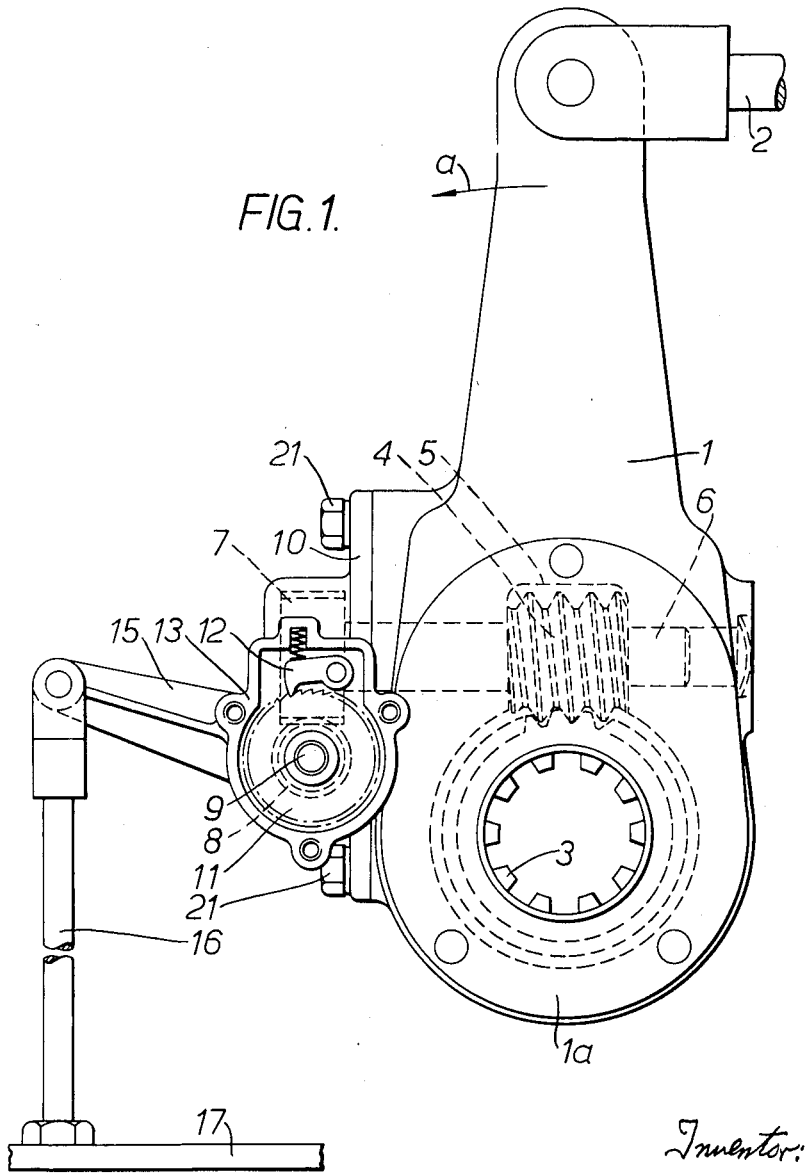

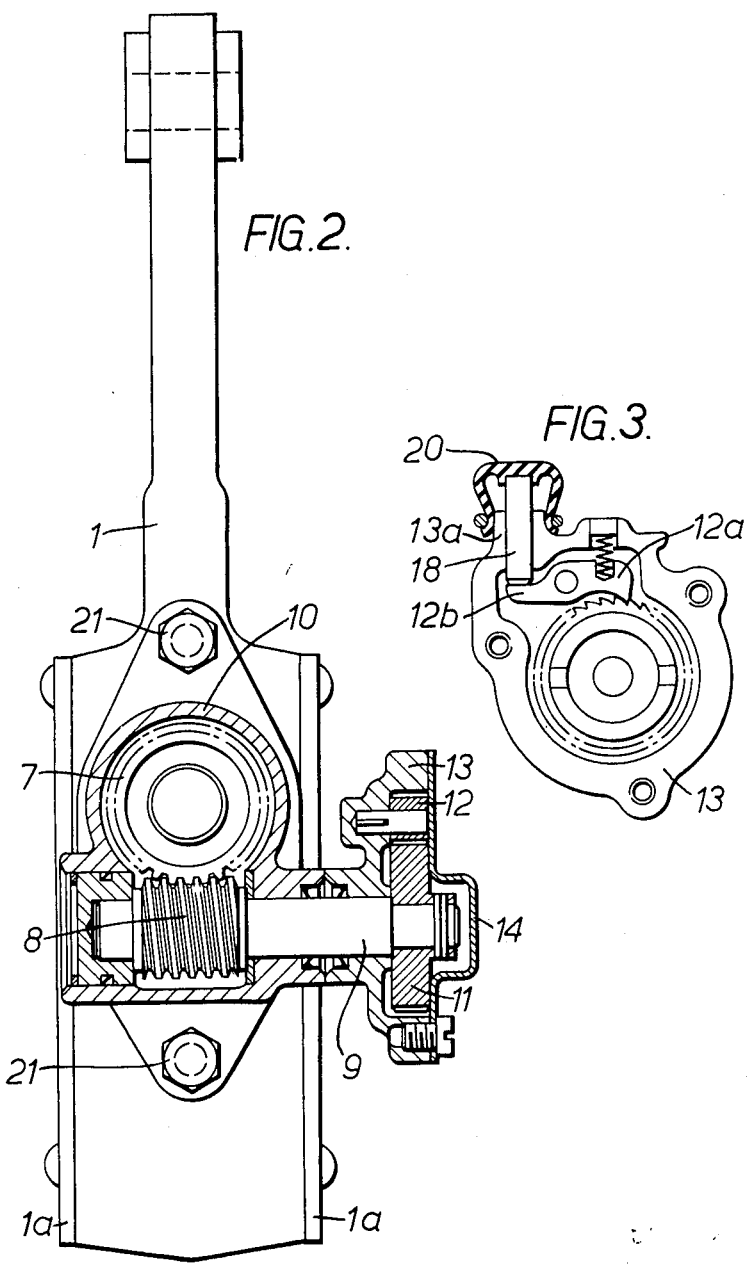

This invention relates to slack adjusters for vehicle brakes and particularly to slack adjusters of the worm gear type used in association with the actuating cam of internal expanding shoe type brakes and comprising a worm wheel adapted to be keyed or splined onto the brake cam shaft, a body member attached to or formed integrally with a brake-actuating arm movable around the axis of the cam shaft, and a worm rotatably mounted in the body member and meshing with the worm wheel, the arrangement being such that movement imparted to the arm by brake-operating mechanism is transmitted rigidly through the worm and worm wheel to the cam shaft while adjustment for wear is effected by rotating the worm wheel relative to the body member. The present invention provides an improved device of this character which is automatic in action to maintain a predetermined clearance between the shoes and the brake drum.

According to the invention a worm gear type slack adjuster is provided with a two-part uni-directional clutch of which one part has driving connection with the worm while the other part is mounted upon a carrier which is rotatable relative to the body member and is restrained against movement by a link connected to a point on the vehicle chassis frame, said clutch being operable to impart rotation to the worm when a predetermined degree of movement of the brake-actuating arm is exceeded.

Preferably, the clutch is of the pawl and ratchet wheel type, the ratchet wheel being connected by gearing to the worm and the pawl being pivoted upon the carrier which is formed as a casing enclosing the clutch, and these and other features of the invention will be more fully understood from the following description of a preferred embodiment which is illustrated in the accompanying drawings wherein:

FIG. 1 is a front view of the slack adjuster with the cover of the clutch housing removed, FIG. 2 is a part-sectional side view of the slack adjuster, and FIG. 3 is a fragmentary view showing a modification.

Referring first to FIGS. 1 and 2, it will be seen that the basic adjuster is of conventional form in that it comprises a banjo-shaped body member 1 formed at its upper end for attachment to a brake rod 2 or like brake actuating gear and apertured at its lower end to receive the worm wheel 3 which in use is splined upon the brake cam shaft (not shown), the apertured portion of the body member being closed at opposite sides by plates 1a riveted thereto. The worm wheel is engaged by a worm 4 located against endwise movement in a recess 5 in the body member 1 and secured fast on a worm shaft 6 journalled in the body member. For the purpose of the present invention the worm shaft is extended at one end and mounted fast on this end of the shaft is a secondary worm wheel 7 meshing with a worm 8 fast on a lay shaft 9 which is located on an axis parallel to the axis of the brake cam shaft and is journalled in bearings provided in or upon a bolted-on extension 10 of the body member forming a secondary worm housing. The lay shaft projects through the housing 10 at one side thereof and secured upon this end of the lay shaft is a ratchet wheel 11 engaged by a spring-loaded pawl 12 carried by an annular casing 13 which encloses the pawl and ratchet gear and which at its inner side is rotatably mounted on the lay shaft. The outer side of the casing 13 is closed by a removable cover plate 14 while formed integrally with said casing is a radial arm 15 which has connection with a rod or equivalent linkage 16 adapted in use to be fixed to a point on the chassis frame, indicated at 17, to prevent rotation of the casing.

In use, the slack adjuster acts as a brake-applying arm and the oscillation of the arm in the direction of arrow *a* to apply the brakes causes the ratchet wheel 11 to rotate relative to the pawl 12. When, due to lining wear, the degree of oscillation reaches a value such that, on a brake application, the pawl rides over a tooth, the ratchet wheel is rotated by the pawl on the release stroke and, through the worm reduction gearing 7, 8 rotates the worm 4 and worm wheel 3 to advance the cam shaft relative to the brake cam lever.

The detachable cover plate 14 provides access to the pawl and ratchet mechanism, when desired, for the purpose of releasing the pawl from said wheel and permitting manual adjustment or service. However, means can be provided for releasing the pawl without removing the cover plate, one such means being shown in FIG. 3 where the pawl 12a is provided with a tail 12b engaged by a plunger 18 which extends through and is guided in an extension 13a of casing 13, the plunger being depressed by a finger to rock the pawl out of engagement with the ratchet wheel. The outer end of the plunger may be enclosed by a flexible cap or grommet 20 which permits actuation of the plunger while excluding dirt and dust.

An alternative method of rotating the brake cam for quick initial adjustment is to remove the two set-bolts 21 which fasten the secondary worm housing 10 to the lever body 1 so that the adjusting mechanism can be detached from the brake lever. Provision can be made on the final worm shaft 3 to rotate the shaft with a suitable spanner or key to effect rapid initial adjustment. The adjusting assembly can then be refitted to the lever.

I claim:

1. In combination with a rotatably mounted vehicle brake cam shaft, a vehicle brake slack adjuster comprising a lever mounted for free rotation about the axis of said cam shaft and having a housing portion peripherally surrounding a section of said cam shaft, a brake actuating member operatively connected to said first lever for rocking said lever about the axis of said cam shaft, a first shaft journalled in said housing portion for rotation about an axis extending at right angles to the rotational axis of said cam shaft, a first worm rigid with said first shaft, a first worm wheel rigid with said section of said cam shaft and constantly meshing with said first worm in said housing portion, said first shaft having an end-extending beyond said housing portion, a housing section rigid with said housing portion and receiving said end of said first shaft, a second shaft journalled in said housing section for rotation about an axis extending at right angles to the rotational axis of said first shaft, a second worm rigid with said second shaft in said housing section, a second worm wheel constantly meshing with said second worm in said housing section and being fixed to said first shaft, one end of said second shaft extending beyond said housing section, a casing formed separately of said housing portion and said housing section and receiving said one end of said second shaft, a ratchet wheel fixed on said second shaft in said casing, a pawl pivotally mounted in said casing, means resiliently biasing said pawl into operative engagement with said ratchet wheel, and means for restraining said casing against movement with said lever, said pawl cooperating with said ratchet to provide a clutch for imparting unidirectional rotation to said first worm through the drive connection of said second worm and second worm wheel when a predetermined degree of movement of said lever is exceeded.

2. The combination defined in claim 1 wherein said housing section is detachable from said housing portion for operatively disconnecting said second worm from said worm wheel.

3. The combination defined in claim 1 wherein said casing is rotatably mounted on said second shaft.

4. The combination defined in claim 3 comprising a plunger carried by said casing and being accessible exteriorly of said casing for manual manipulation to disengage said pawl from said ratchet wheel.

References Cited by the Examiner

UNITED STATES PATENTS

| | | | |
|---|---|---|---|
| 1,661,191 | 3/1928 | Midboe | 188—79.5 |
| 2,144,086 | 1/1939 | Rowland et al. | 188—79.5 |
| 2,650,681 | 9/1953 | Shively | 188—79.5 |
| 2,884,097 | 4/1959 | Stultz et al. | 188—196 |
| 3,013,638 | 12/1961 | Satrum | 188—79.5 |

DUANE A. REGER, *Primary Examiner.*